US007419650B2

(12) United States Patent
Pierard et al.

(10) Patent No.: US 7,419,650 B2
(45) Date of Patent: Sep. 2, 2008

(54) METHOD FOR THE PRODUCTION OF FUNCTIONALISED SHORT CARBON NANOTUBES AND FUNCTIONALISED SHORT CARBON NANOTUBES OBTAINABLE BY SAID METHOD

(75) Inventors: Nathalie Pierard, Ham-sur-Heure (BE); Antonio Fonseca, Louvain-la-Neuve (BE); Zoltan Konya, Szeged (HU); Narasimaiah Nagaraju, Jayanagar (IN); Isabelle Willems, Soye (BE); Silvio Tollis, Ransart (BE); Geoffroy Bister, Jambes (BE); Janos B. Nagy, Jambes (BE); Dorina Popa, Belgrade (BE)

(73) Assignee: Facultes Universitaries Notre-Dame De La Paix, Namur (BG)

( * ) Notice: Subject to any disclaimer, the term of this patent is extended or adjusted under 35 U.S.C. 154(b) by 628 days.

(21) Appl. No.: 10/363,201

(22) PCT Filed: Aug. 21, 2001

(86) PCT No.: PCT/BE01/00140

§ 371 (c)(1),
(2), (4) Date: Mar. 6, 2003

(87) PCT Pub. No.: WO02/20402

PCT Pub. Date: Mar. 14, 2002

(65) Prior Publication Data

US 2004/0028599 A1 Feb. 12, 2004

(30) Foreign Application Priority Data

Sep. 6, 2000 (EP) .................................. 00870191

(51) Int. Cl.
*D01F 9/12* (2006.01)
(52) U.S. Cl. ..................... 423/447.1; 977/748; 977/847; 977/848
(58) Field of Classification Search .................. 977/748, 977/847, 461, 848; 423/461, 447.1
See application file for complete search history.

(56) References Cited

U.S. PATENT DOCUMENTS 5,560,898 A  10/1996  Uchida et al.

FOREIGN PATENT DOCUMENTS

EP  1022763  7/2000

| JP | 2000-026760 | 1/2000 |
| WO | WO 98/05920 | 2/1998 |
| WO | WO98/39250 | * 9/1998 |

OTHER PUBLICATIONS

Duesberg, G.S., et al. (1999 No Month) Chromatography of Carbon Nanotubes. Synthetic Materials 103:2484-2485.*
Flahaut. E., et al. (2000 No Month) Carbon Nanotube-Metal-Oxide Nanocomposties:. Acta Mater 48:3803-3812.*
Nagasawa S., et al., (Oct. 2000) Effect of Oxidation on Single-Wall Carbon Nanotubes. Chemical Physics Letters 328:374-380.*
Basca R.R., et al., (Dec. 2000) High Specific Surface Area Carbon Nanotubes From Catalytic Chemical Vapor Deposition Process. Chemical Physics Letters 323:566-571.*
Mickelson E.T., et al., (Oct. 1998) Fluorination of Single-Wall Carbon Nanotubes. Chemical Physics Letters 296:188-194.*
Jia Z., et al., (1999 No Month) Study on Poly(Methyl Methacrylate)/Carbon Nanotube Composites. Materials Sciences and Engineering A271: 395-400.*
Stepanek I., et al., (Jun. 2000) Nano-Mechanical Cutting and Opening of Single Wall Carbon Nanotubes. Chemical Physics Letters 331:125-131.*
Chen, J., et al. (1998) Solution Properties of Single-Walled Carbon Nanotubes. Science 282:95-98.
Chen, J., et al. (2001) Cyclodextrin-Mediated Soft Cutting of Single-Walled Carbon Nanotubes. J. Am. Chem. Soc. 123(26):6201-6202.
Hamon, M. A., et al. (1999) Dissolution of Single-Walled Carbon Nanotubes. Adv. Mater. 11(10):834-840.
Jia, Z., et al. (1999) Production of short multi-walled carbon nanotubes. Carbon 37(6):903-906.
Liu, J., et al. (1998) Fullerene Pipes. Science 280:1253-1256.
Nakanishi, M. (2000) Functional coating agent compositions. Database Accession No. 132:109498 CA; XP002186147. (Abstract).
Stepanek, I., et al. (1999) Cutting Single Wall Carbon Nanotubes. Mat. Res. Soc. Symp. Proc. 593:119-122.
Tiano, T. et al. (2000) Functionalization of single-wall nanotubes for improved structural composites. Database Accession No. 135:211894 CA; XP002186150. (Abstract).

* cited by examiner

*Primary Examiner*—Wayne A. Langel
*Assistant Examiner*—James Fiorito
(74) *Attorney, Agent, or Firm*—Knobbe Martens Olson & Bear LLP

(57) ABSTRACT

The present invention is related to a method for producing functionalised short carbon nanotubes with at least one open tip by mechanical treatment of long carbon nanotubes, wherein said long nanotubes are submitted to mechanical milling forces in the presence of a reactant able to chemically react with the nanotubes so that short carbon nanotubes comprising at least one specific chemical group are obtained.

14 Claims, 14 Drawing Sheets

US 7,419,650 B2

METHOD FOR THE PRODUCTION OF FUNCTIONALISED SHORT CARBON NANOTUBES AND FUNCTIONALISED SHORT CARBON NANOTUBES OBTAINABLE BY SAID METHOD

RELATED APPLICATIONS

This is the U.S. national phase under 35 U.S.C. §371 of International Application PCT/BE01/00140, filed Aug. 21, 2001, which claims priority to European Patent Application 00870191.4, filed Sep. 6, 2000.

FIELD OF THE INVENTION

The present invention is related to the field of carbon nanotubes. More precisely, the present invention is related to the material called short carbon nanotubes.

STATE OF THE ART

Carbon nanotubes were first observed by Iijima in 1991 (S. Iijima, Nature 354, 56-58 (1991)) as a by-product of fullerene synthesis. Typically, the nanotubes consist of multilayers (normally 2-50) of concentric carbon tubes which are capped at both ends. The tubes are built up of sheets of carbon atoms arranged in hexagons and pentagons, with the pentagons concentrated in areas of low radius curvature such as the tube ends. The tubes contain a hollow core up to 50 nm across typically 100-200 µm in length. Hence, single-wall tubes have been also found.

Their remarkable mechanical and electrical properties associated with their ability to be produced at large scale by arc discharge, by catalytic decomposition of hydrocarbons, or by laser ablation for example, explain why the carbon nanotubes are currently extensively investigated.

Nanotubes can be potentially used in various application fields such as field emission (Q. H. Wang et al., Appl. Phys. Lett. 72, 2912-2913 (1998)), electric and thermal conductivity (R. Andrews et al., Appl. Phys. Lett. 75, 1329-1331 (1999)), hydrogen storage and molecular sieves.

For applications such as hydrogen storage and molecular sieves, it has been demonstrated that problems of diffusion limitation were encountered when nanotubes were used (C. Liu et al., Science 286, 1127-1129 (1999); M. S. Dresselhaus et al., MRS Bulletin 24, No. 11, 45-50 (1999)). To overpass these problems the use of short nanotubes, ideally shorter than 1 µm, with open ends has been suggested. One solution could be to produce said short nanotubes from long carbon nanotubes. However, the production of such short nanotubes represents a great challenge since recent discussion shows that nanotubes are flexible and resistent when stress is applied (H. Dai et al., Nature 384, 147-150 (1996); M. M. J. Treacy et al., Nature 381, 678-680 (1996); S. S. Wong et al., J. Am. Chem. Soc. 120, 8557-8558 (1998); T. Kuzumaki et al., J. Mater. Res. 13, 2445-2449 (1998)).

Methods for cutting nanotubes using ultrasounds (K. L. Lu et al., Carbon 34, 814-816 (1996); K. B. Shelimov et al., Chem. Phys. Lett. 282, 429-434 (1998); J. Liu et al., Science 280, 1253-1256 (1998)) or STM voltage (L. C. Venema et al., Appl. Phys. Lett. 71, 2629-2631 (1999)) have been proposed. Nevertheless, these techniques are restricted to milligram scale production. Moreover, the sample of carbon nanotubes obtained after ultrasounds treatment is relatively inhomogeneous in length and contains only a few short carbon nanotubes, while the STM voltage method gives short carbon nanotubes, but with closed tips. Furthermore, methods of cutting carbon nanotubes using ball milling have also been proposed but only for the production of nanoparticles (Y. B. Li et al., Carbon 37, 493-497 (1999)), nanoporous carbon (Y. Chen et al., Appl. Phys. Lett. 74, 2782-2784 (1999)) or curved nanostructures (J. Y. Huang et al., Chem. Phys. Lett. 303, 130-134 (1999)). In particular, the ball milling process described by Y. B. Li et al., Carbon 37, 493-497 (1999) uses balls and iron particles of approximately 1 µm in diameter.

Moreover, for various applications, it would be of particular interest to have functionalised carbon nanotubes, and particularly short functionalised carbon nanotubes. For example, this functionalisation could allow the industrial production of composite materials through the linkage of carbon naotubes to specific polymers. Enhancement of the physical and mechanical properties of the carbon nanotubes could also be reached through such a functionalisation. As an example, gases storage properties of the nanotubes could be enhanced by limiting the natural aggregation of the nanotubes caused by Van der Waals interactions, so that gases such as hydrogen or methane could more efficiently adsorb not only on the inner surface of the nanotubes but also on their outer surface.

However, at the moment only few examples of chemical funtionalisation methods have been described (J. Chen et al., Science 282, 95-98 (1998); Y. Chen et al., J. Mater. Res. 13, 2423-2431 (1998); M. A. Hamon et al., Adv. Mater. 11, 834-840 (1999); A. Hiroki et al., J. Phys. Chem. B 103, 8116-8121 (1999)) and there is still a need for methods for large scale production of functionalised short carbon nanotubes.

AIMS OF THE INVENTION

The present invention aims to provide a method for producing functionalised short carbon nanotubes.

In particular, the present invention aims to provide a method for producing short functionalised carbon nanotubes with open tips in gram or larger scale.

Another aim of the present invention is to provide a method for producing short functionalised carbon nanotubes whose structure is globally conserved comparing to the structure of long nanotubes.

Another aim of the present invention is to provide a method for producing short functionalised carbon nanotubes with open tips at an increased yield compared to the yields obtained until now.

The present invention also aims to provide a method for producing short functionalised carbon nanotubes which can be easily and rapidly performed.

SUMMARY OF THE INVENTION

The present invention is related to a method for producing functionalised short carbon nanotubes with at least one open tip by mechanical treatment of long carbon nanotubes, wherein said long nanotubes are submitted to mechanical milling forces in the presence of a reactant able to chemically react with nanotubes so that short carbon nanotubes comprising at least one specific chemical group are obtained.

It should be understood that the term "mechanical milling forces" refers to all mechanical forces able to mill long carbon nanotubes into short carbon nanotubes with at least one open tip, as opposed to chemical treatment and electrical treatment such as STM voltage. Examples of such mechanical milling forces are impact forces, friction forces, shearing forces, pressure forces or cutting forces.

Preferably, the present invention is related to a method for producing functionalised short carbon nanotubes with at least one open tip by mechanical treatment of long carbon nanotubes, characterised in that it comprises the step of submitting said long nanotubes to impact forces in the presence of a reactant so that functionalised short carbon nanotubes are obtained.

Preferably, the reactant is selected from the group consisting of liquids, solids and gases, depending on the working temperature and pressure.

Preferably, said method comprises the following steps:
making a powder containing long carbon nanotubes, the purity of which varies from 1 to 100%;
introducing said powder into a ball milling apparatus containing one or several solid particles greater than 1 mm in length, preferably greater than 2 cm in length;
removing water;
grinding said powder with said ball milling apparatus for a sufficient time so that a mixture containing a specific percentage of short nanotubes with specific length is obtained, while introducing the adequate reactant;
removing potential excess of reactant.

Preferably, the reactant is selected from the group consisting of air, $H_2$, $H_2O$, $NH_3$, $R-NH_2$, $F_2$, $Cl_2$, $Br_2$, $I_2$, $S_8$, alcohols, thiols, acids, bases, esters, peracids, peroxids, CO, $COCl_2$ and $SOCl_2$.

Preferably, the chemical or functional group introduced on the short carbon nanotubes produced is selected from the group consisting of SH, $NH_2$, NHCO, OH, COOH, F, Br, Cl, I, H, R—NH, R—O, R—S, CO, COCl and SOCl.

Preferably, the potential excess of reactant gas is removed through heating under nitrogen atmosphere or exposition to vacuum.

Preferably, the solid particles contained in the milling apparatus are balls.

Preferably, the speed and the vertical vibration intensity of grinding are comprised within 3000-6000 vibrations/min and 0-3 mm, respectively.

Preferably, the time of grinding is comprised between $10^{-3}$ and $10^3$ h.

The grinding process may be continuous or discontinuous.

Preferably, the long carbon nanotubes are synthesised on a support containing at least one metal and said long carbon nanotubes are purified before being submitted to grinding, by dissolution of said support.

Preferably, said dissolution consists in a first dissolution at a temperature comprised between 0-100° C. in a concentrated acidic solution and in a second dissolution at a temperature comprised between 100-250° C. in a concentrated basic solution, preferably a NaOH concentrated solution. The first dissolution may be performed either before or after the second dissolution.

Preferably, the grinding is carried out in the presence of a solvent, which can be in the liquid state or in the frozen state, such as $H_2O$, liquid nitrogen, or an organic solvent.

Preferably, the long carbon nanotubes are submitted to at least one pre-treatment with an acid solution or a base solution and are then eventually dried.

Preferably, the long carbon nanotubes are also submitted to at least one oxidisation pre-treatment with an oxidant in solution, or in gas phase at temperatures above 100° C.

The long carbon nanotubes may also be submitted to at least one reduction pre-treatment with a hydrogen containing gas mixture at temperatures above 400° C.

Preferably, the method according to the invention further comprises the purification of the functionalised short carbon nanotubes finally obtained according to their length by classical purification methods, preferably by size exclusion chromatography.

The percentage of functionalised short nanotubes contained in the mixture finally obtained according to the present invention is comprised between 1 and 100%.

Moreover, the length of the functionalised short nanotubes contained in the mixture finally obtained by the method according to the present invention is shorter than 50 µm, preferably shorter than 2 µm.

Preferably, the length of long carbon nanotubes to be treated by the method according to the present invention is comprised between 1 µm and 500 µm.

The long carbon nanotubes may be single-wall long carbon nanotubes or multi-wall long carbon nanotubes or a mixture thereof.

Moreover, the present invention also relates to functionalised short carbon nanotubes obtainable by a method in which long nanotubes are submitted to mechanical milling forces in the presence of a reactant so as to allow the introduction of at least one specific chemical group on the short carbon nanotubes produced during the milling.

The present invention also relates to functionalised short carbon nanotubes obtainable by any one of the methods mentioned hereabove.

Finally, the present invention is also related to a mixture comprising long nanotubes and at least 10% of functionalised short carbon nanotubes, said functionalised short carbon nanotubes having at least one open tip and having an average length smaller than 50 µm, preferably shorter than 2 µm.

SHORT DESCRIPTION OF THE DRAWINGS

It should be noticed that the expression <<open tip>> means that the hollow core of the nanotube is open (and accessible to small molecules) at the nanotube tip.

The word <<SWNT(s)>> is the abbreviation for single-walled carbon nanotube(s), while the word <<MWNT(s)>> is the abbreviation for multi-walled carbon nanotube(s).

SEM and TEM refer to Scanning and Transmission Electron Microscopy, respectively.

The expression <<thin MWNTs>> used hereafter refers to MWNTs having an average inner/outer diameter of 4/15 nm.

The expression <<thick MWNTs>> used hereafter refers to MWNTs having an average inner/outer diameter of 6/25 nm.

It should be noticed that, in the figures and experiments described hereafter, the reactant used during the ball milling, if not specified, is $H_2O$ from moist air.

FIG. 5a represents diffraction patterns of SWNTs before (curve A) and after (curve B) 8 hours of ball milling.

FIG. 5b represents diffraction patterns of thin MWNTs before (curve A) and after (curve B) 12 hours of ball milling.

FIG. 5c represents diffraction patterns of thick MWNTs before (curve A) and after (curve B) 120 hours of ball milling.

FIG. 8a represents a TEM image of thin MWNTs before separation by size exclusion chromatography according to the method of the present invention.

Figure 8A:
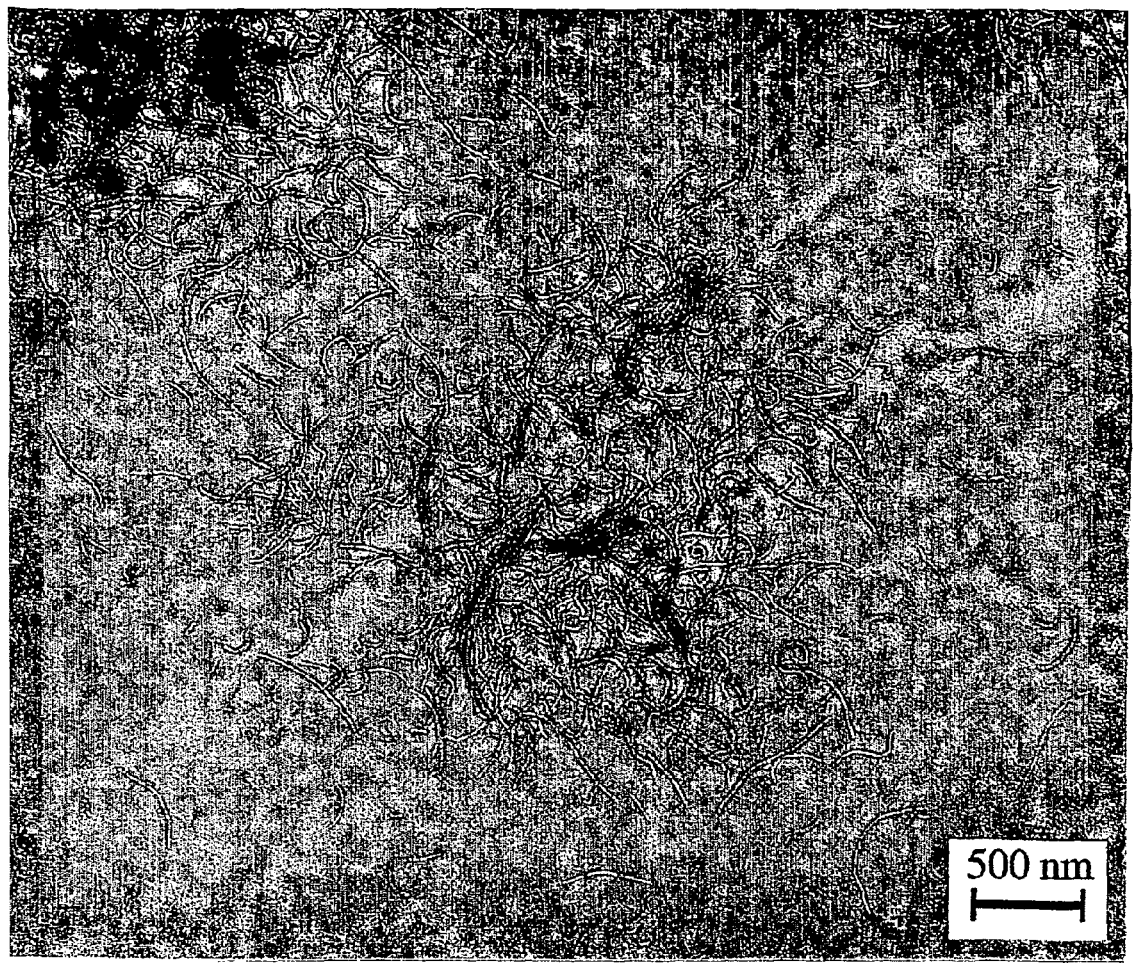
FIGS. 8a-8d represent TEM images of thin MWNTs after a 12 hours ball milling according to the present invention.
Figure 8B:
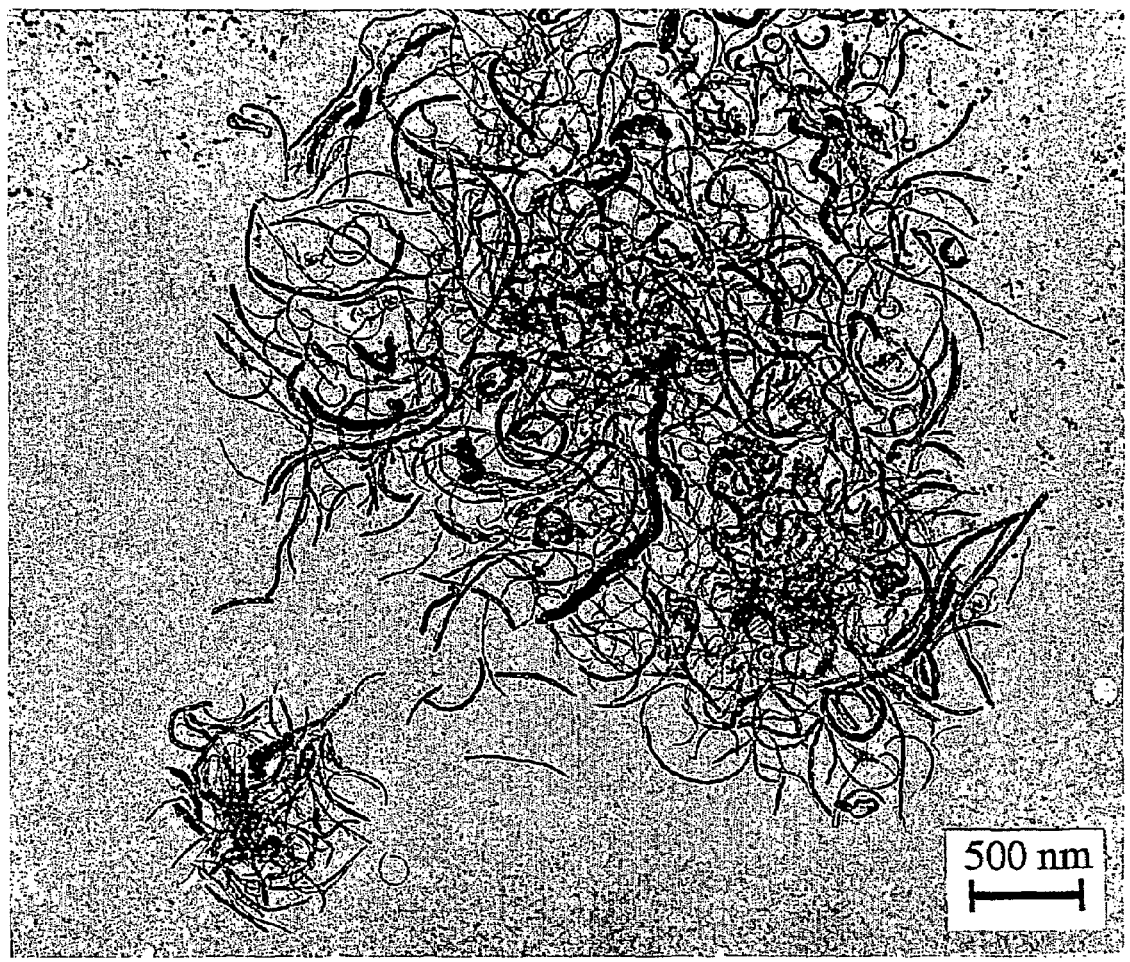
Figure 8C:
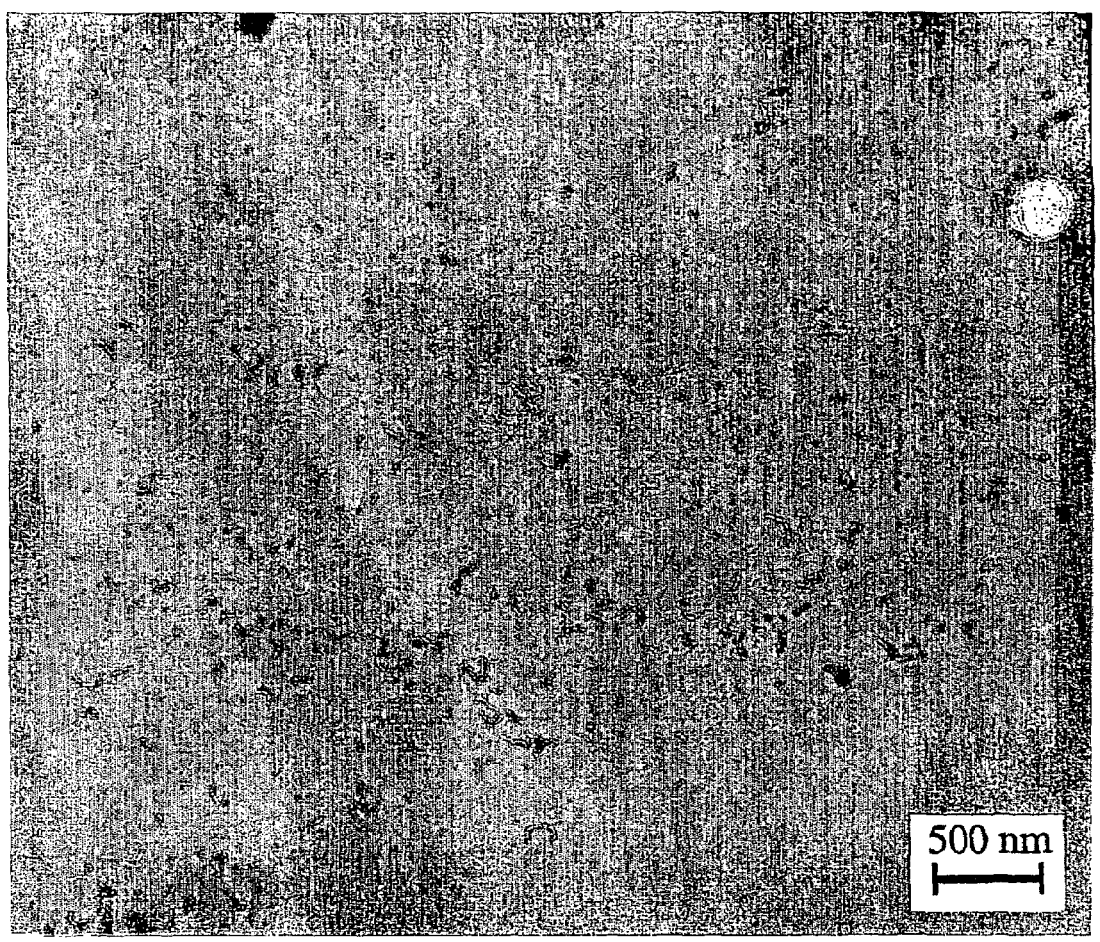
Figure 8D:
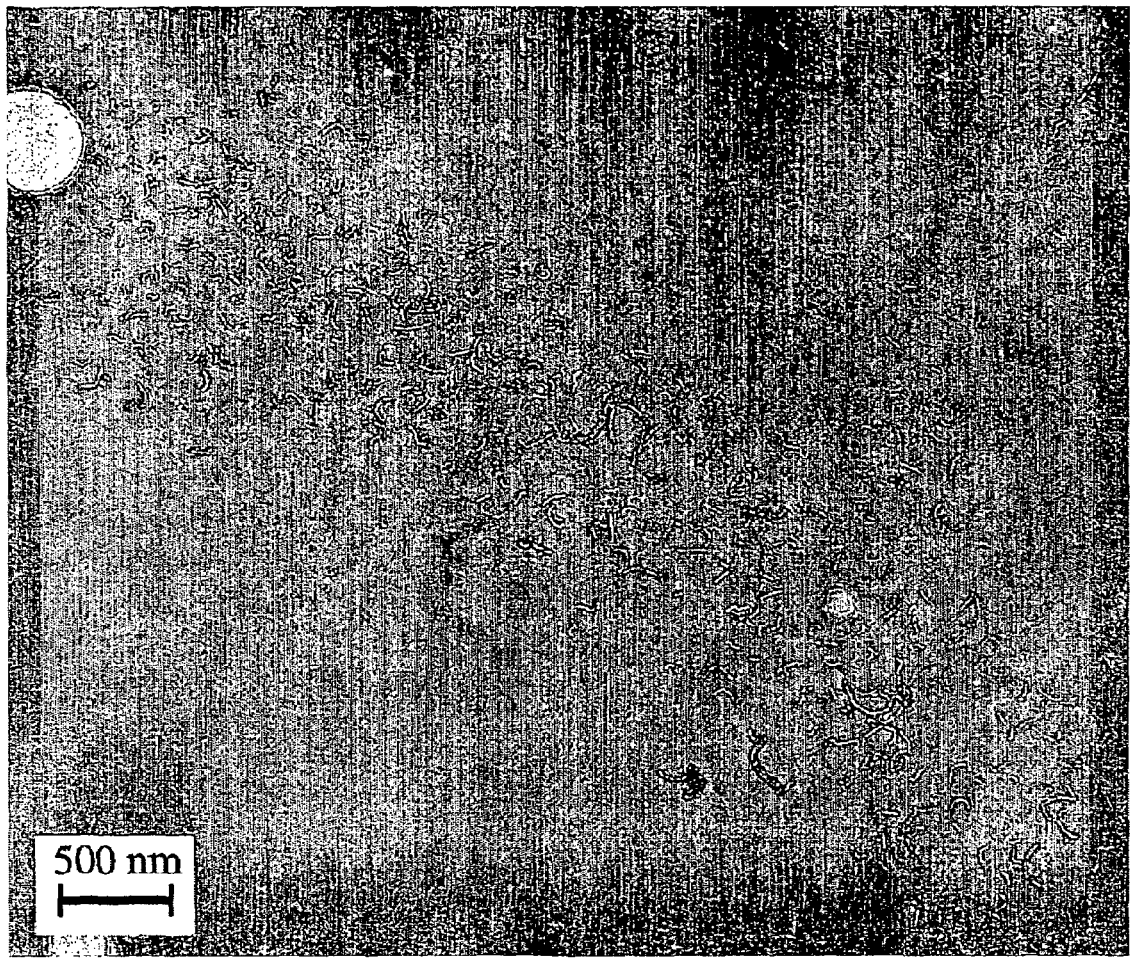

FIGS. 8b-8d represent TEM images of thin MWNTs separated by size exclusion chromatography according to the method of the present invention, the elution volume being 7.5 ml (fraction 2 of the elution profile), 39 ml (fraction 9 of the elution profile) and 48 ml (fraction 11 of the elution profile) for FIG. 8b, FIG. 8c and FIG. 8d, respectively.

Figures 9A, 9B:
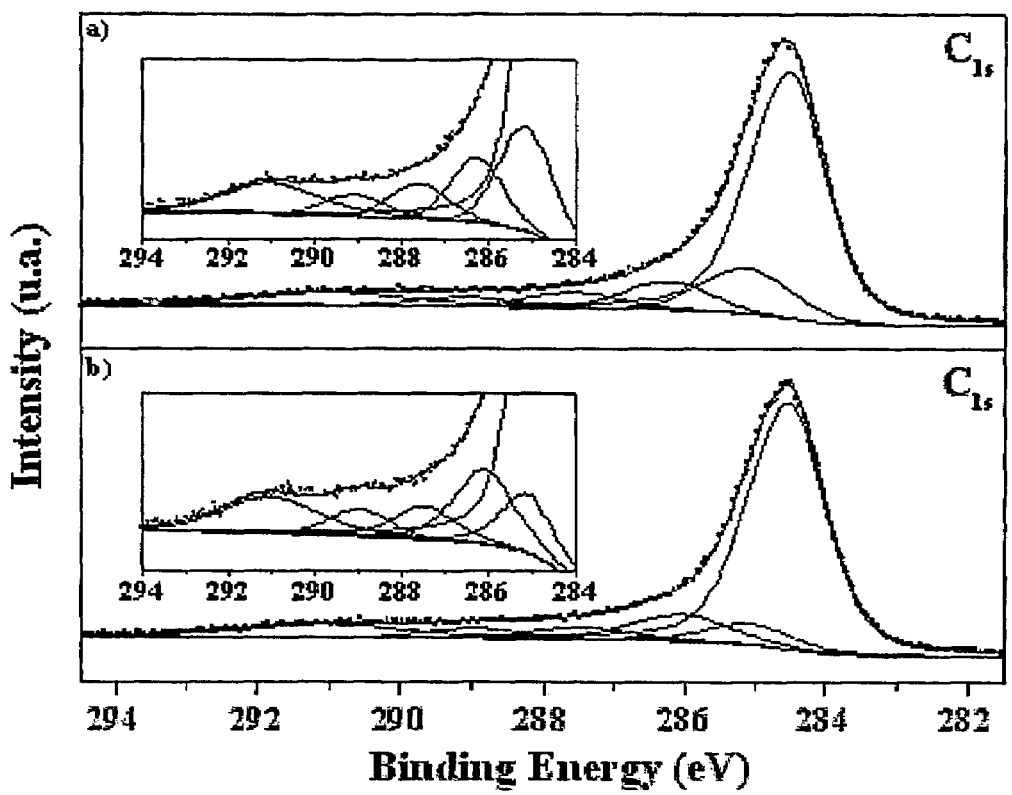

FIG. 9a represents the deconvolution of $C_{1s}$XPS spectra of purified thin MWNTs before ball milling.

FIG. 9b represents the deconvolution of $C_{1s}$XPS spectra of purified thin MWNTs submitted to ball milling in the presence of $NH_3$.

Figures 10A, 10B:
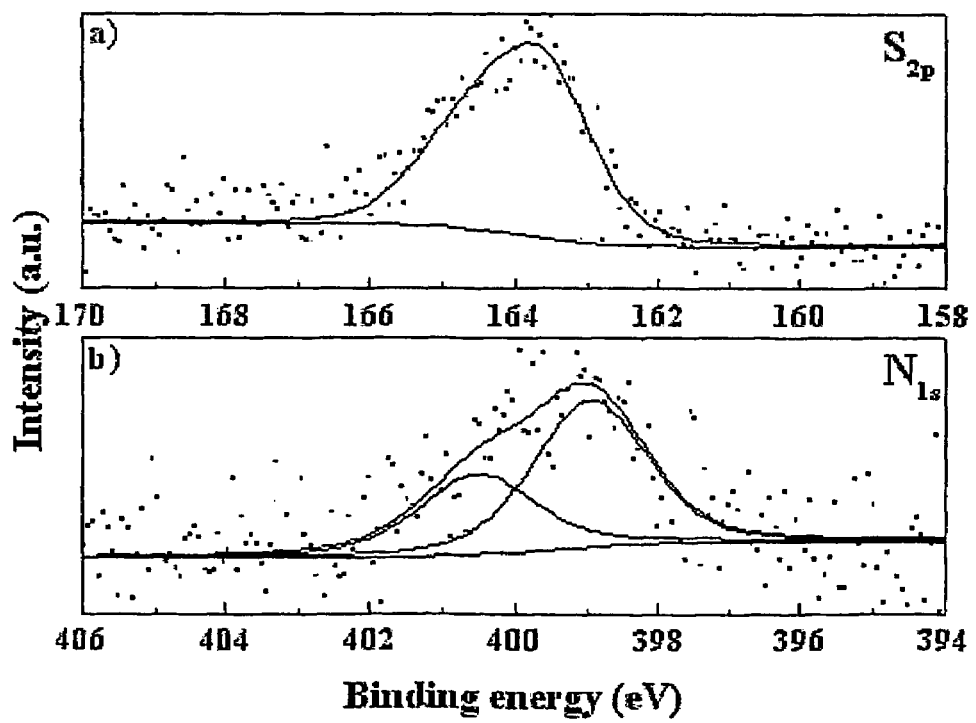

FIG. 10a represents the deconvolution of $S_{2p}$XPS spectra of thin MWNTs submitted to ball milling in the presence of $H_2S$.

FIG. 10b represents the deconvolution of $N_{1s}$XPS spectra of thin MWNTs submitted to ball milling in the presence of $NH_3$.

DESCRIPTION OF PREFERRED
EMBODIMENTS OF THE INVENTION

Production of Long Carbon Nanotubes

According to known methods, single-wall carbon nanotubes (SWNTs) and multi-wall carbon nanotubes (MWNTS) were firstly prepared by catalytic decomposition of hydrocarbons using a supported catalyst. The supported catalyst is composed of at least one metal <<supported>> on a support. The support can be for example a zeolite (such as NaY, NaX or ZSM-5), an oxide (such as MgO, $Al_2O_3$ or $SiO_2$), a mixture of oxides or a clay.

To prepare the supported catalyst, the impregnation method was performed with a preferred concentration of 5% wt % for Co, Fe, Ni, V and Mo alone and 2.5/2.5 wt % for Co/Fe, Co/Ni Co/V and Co/Mo. However, a total metal concentration lower or higher than 5 wt %, composed of at least one metal can also be used to produce SWNTs and MWNTs.

It should be noticed that the supported catalyst for MWNTs production was prepared according to a known process previously described by P. Piedigrosso et al., *Phys. Chem. Chem. Phys.* 2, 163-170 (2000); I. Willems et al., *Chem. Phys. Lett.* 317, 71-76 (2000); K. Hernadi et al., *Zeolites* 17, 416-423 (1996).

The supported catalyst for SWNTs production was prepared according to a known process previously described by J.-F. Colomer et al., *Chem. Commun.* 1343-1344 (1999) and J.-F. Colomer et al., *Chem. Phys. Lett.* 317, 83-89 (2000).

The production of long MWNTs was carried out at 700° C. during 1 hour using acetylene or ethylene flow of 30 ml/min and 300 ml/min of $N_2$ as carrier gas.

The production of long SWNTs was carried out at 1000° C. or 1080° C. during 10 min using methane or ethylene flow of 80 ml/min and 300 ml/min of $H_2$ as carrier gas.

Long MWNTs finally synthesised on Co/NaY zeolite (5/95 wt %) were nanotubes with an average inner/outer diameter of 6/25 nm and a length of 50 μm and will be called <<long thick MWNTS>> hereafter.

Long MWNTs finally synthesised on Co/Fe/NaY zeolite (2.5/2.5/95 wt %) were nanotubes with an average inner/outer diameter of 4/15 nm and a length of 50 μm and will be called <<long thin MWNTs>> hereafter.

Long MWNTs finally synthesised on Co/Fe/$Al_2O_3$ zeolite (1.6/1.6/95.8 wt %) were nanotubes with an average inner/outer diameter of 5/10 nm and a length of 10 μm and will be called <<long very thin MWNTs>> hereafter.

Long SWNTs finally synthesised by catalytic decomposition of methane on Co/MgO (2.5/97.5 wt %) were nanotubes with an average diameter of 2 nm and a length of 10 μm and will be called <<long SWNTs>> hereafter.

Long MWNTs synthesized on metal(s)/support (the support being $Al_2O_3$, $SiO_2$, or zeolite) were then purified following a two step-process. In the first step, the metal(s) was/were dissolved in concentrated acid solution (HCl concentrated), then the support was dissolved in concentrated NaOH solution (40 wt %) at high temperature (100-250° C.) in order to obtain MWNTs contaminated with pyrolitic carbon. When the support is zeolite, an alternative first step is to dissolve the zeolite and metal(s) in concentrated HF (38 wt %) in order to obtain MWNTs contaminated with pyrolitic carbon. In the second step, the pyrolitic carbon was eliminated according to the $KMnO_4/H_2SO_4$ aqueous oxidation procedure as disclosed in K. Hernadi et al., *Zeolites* 17, 416-423 (1996), the quantity of $KMnO_4$ being of 0.2 and 0.3 equivalents for long thin MWNTs and long thick MWNTs, respectively.

Long SWNTs synthesized on metal(s)/Mgo were then purified by dissolving the metal(s)/MgO in concentrated HCl (37 wt %) solution in order to obtain SWNTs contaminated with encapsulated metal nanoparticles.

Part I—Production of Functionalised Short Carbon Nanotubes Using $H_2O$ from Moist Air as Reactant According to a preferred embodiment of the present invention, the starting material is a fibrous, granular or aggregated product containing long thick MWNTs, long thin MWNTs, long very thin MWNTs or long SWNTs. The SWNTs are isolated or in bundles.

The powder was introduced into a ball milling apparatus containing an agate bowl (5 cm in diameter) and available on the market under the trademark <<Pulverisette 0>> (FRITSCH company, Germany). A ball milling was carried out at an amplitude (vertical vibration intensity) of 3 mm and a speed of 3000 vibrations/min. The pressure was of 1 bar of moist air.

It should be noticed that the grinding in this embodiment is continuous but a discontinuous grinding is also possible.

In this embodiment, the mechanical treatment applied to the sample in order to break the nanotubes uses an impact force. Other types of mechanical treatments could be used such as friction forces, shearing forces, pressure forces or cutting forces.

However, the use of an impact force produced by one ball or by several balls, eventually of different dimensions is the preferred mechanical treatment. Moreover, said balls can be made of material other than agate, as stainless steel for example.

Effect of the Ball Milling on Nanotubes

The effect of ball milling on nanotubes following the method described hereabove was analysed from X-Ray diffraction measurements performed on a PW3710 BASED diffractometer (Philips) using $CuR_\alpha$ radiation (1.5418 Å) and from transmission electron microscopy images obtained with a Tecnai 10 (Philips) microscope. To prepare TEM grids, 1 mg of sample was dispersed into 20 ml of toluene, followed by 2 minutes sonication. Then a drop was deposited on a Cu/Rh grid covered with a vinyl polymer called formvar, and the grid was dried overnight under vacuum.

1.—Direct Observation

TEM images taken for different ball milling times are presented on FIGS. 1a-1f for both thin and thick MWNTs. These images show that the nanotube length decreases when the ball milling time increases.

Figures 1A, 1B, 1C, 1D, 1E, 1F:
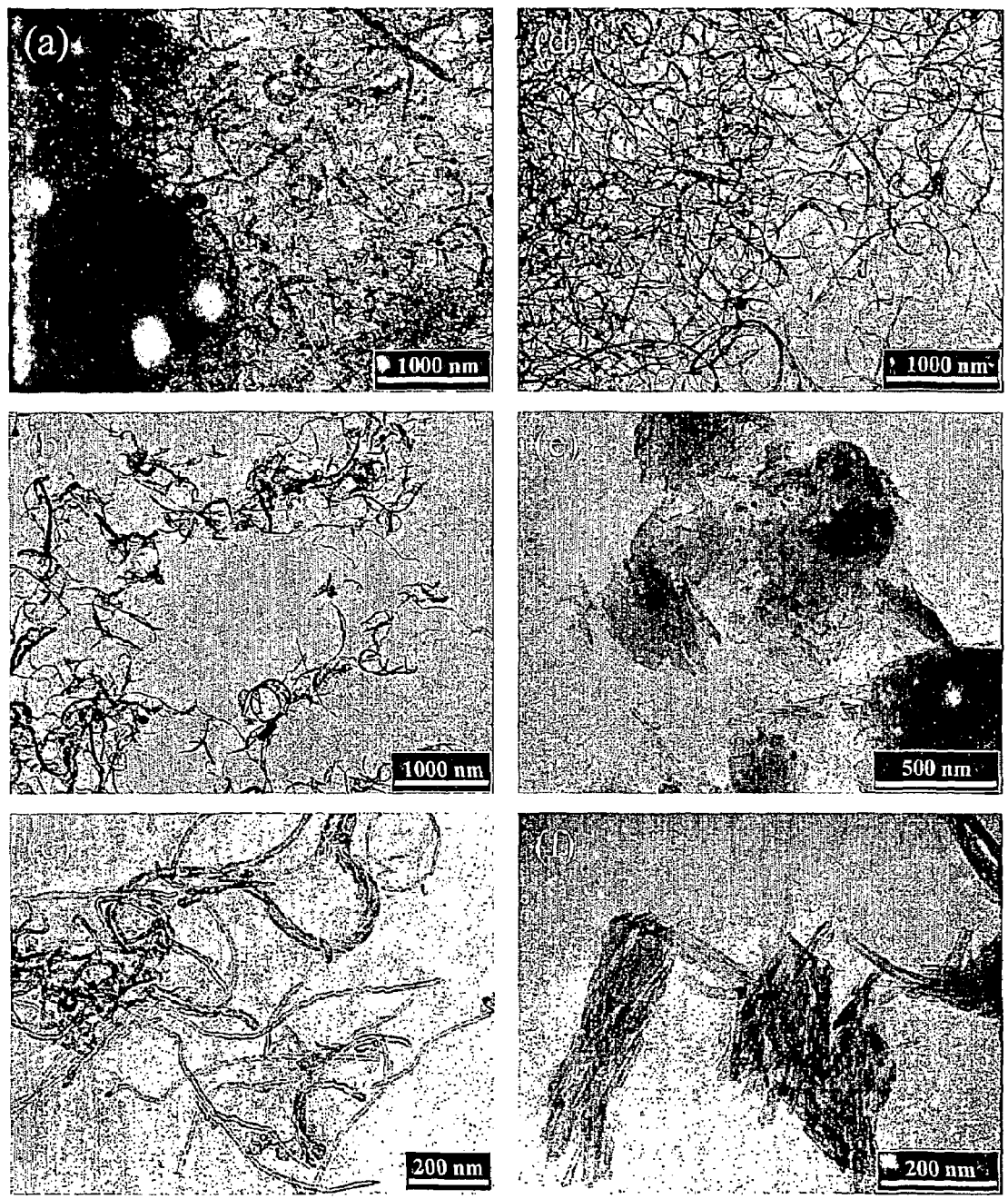
FIG. 1a represents a low magnification TEM image of thin MWNTs before ball milling according to the present invention.
FIGS. 1b and 1c represent low magnification TEM images of thin MWNTs after 12 hours of ball milling in the presence of $H_2O$ from moist air according to the present invention.
FIG. 1d represents a low magnification TEM image of thick MWNTs before ball milling according to the present invention.
FIGS. 1e and 1f represent low magnification TEM images of thick MWNTs after 120 hours of ball milling according to the present invention.
Figures 2A, 2B, 2C, 2D, 2E, 2F:
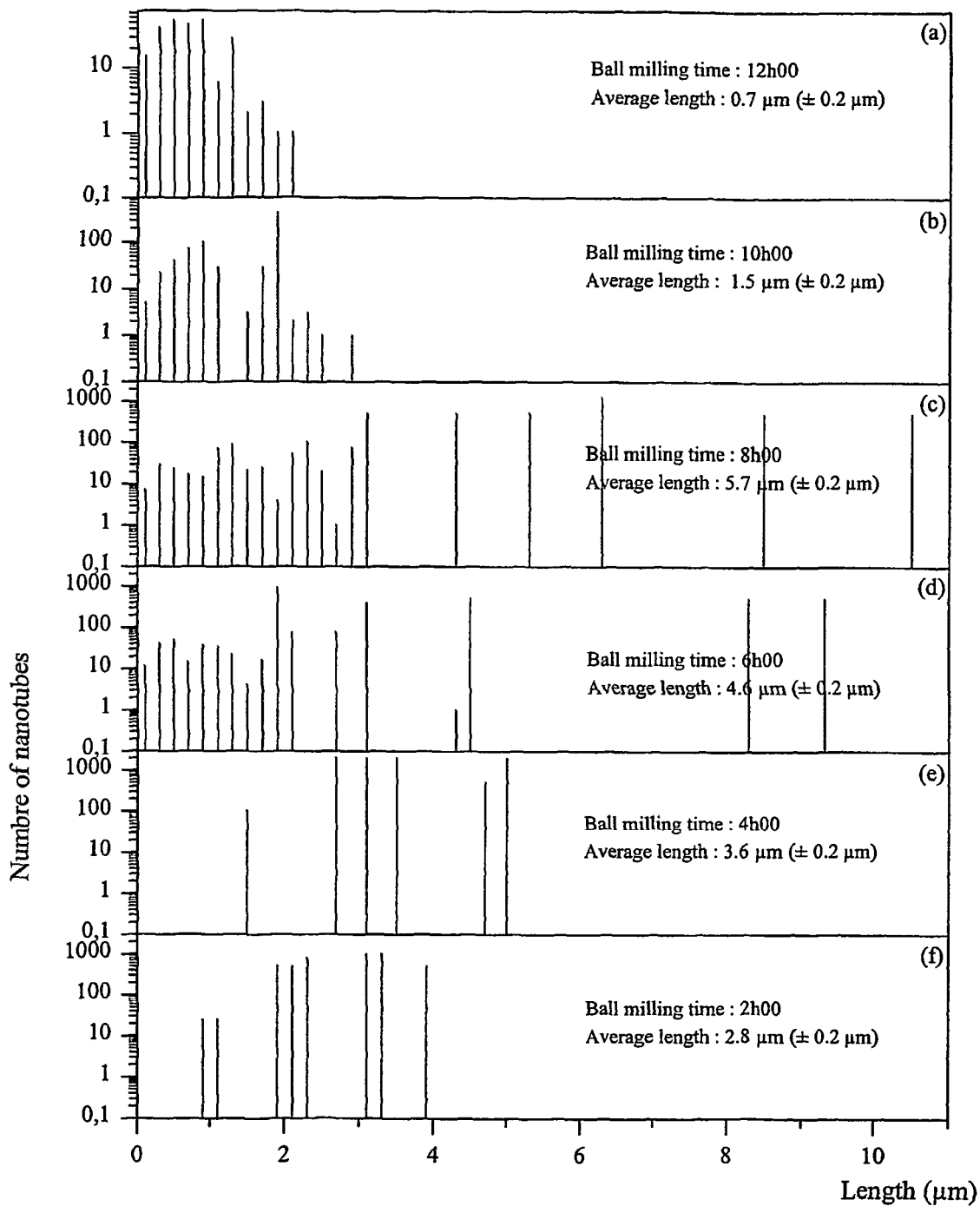
FIGS. 2a-2f represent the length distribution of thin MWNTs for a ball milling time according to the present invention of 12, 10, 8, 6, 4 and 2 hours for FIG. 2a, FIG. 2b, FIG. 2c, FIG. 2d, FIG. 2e and FIG. 2f, respectively.
Figures 3A, 3B, 3C, 3D, 3E:
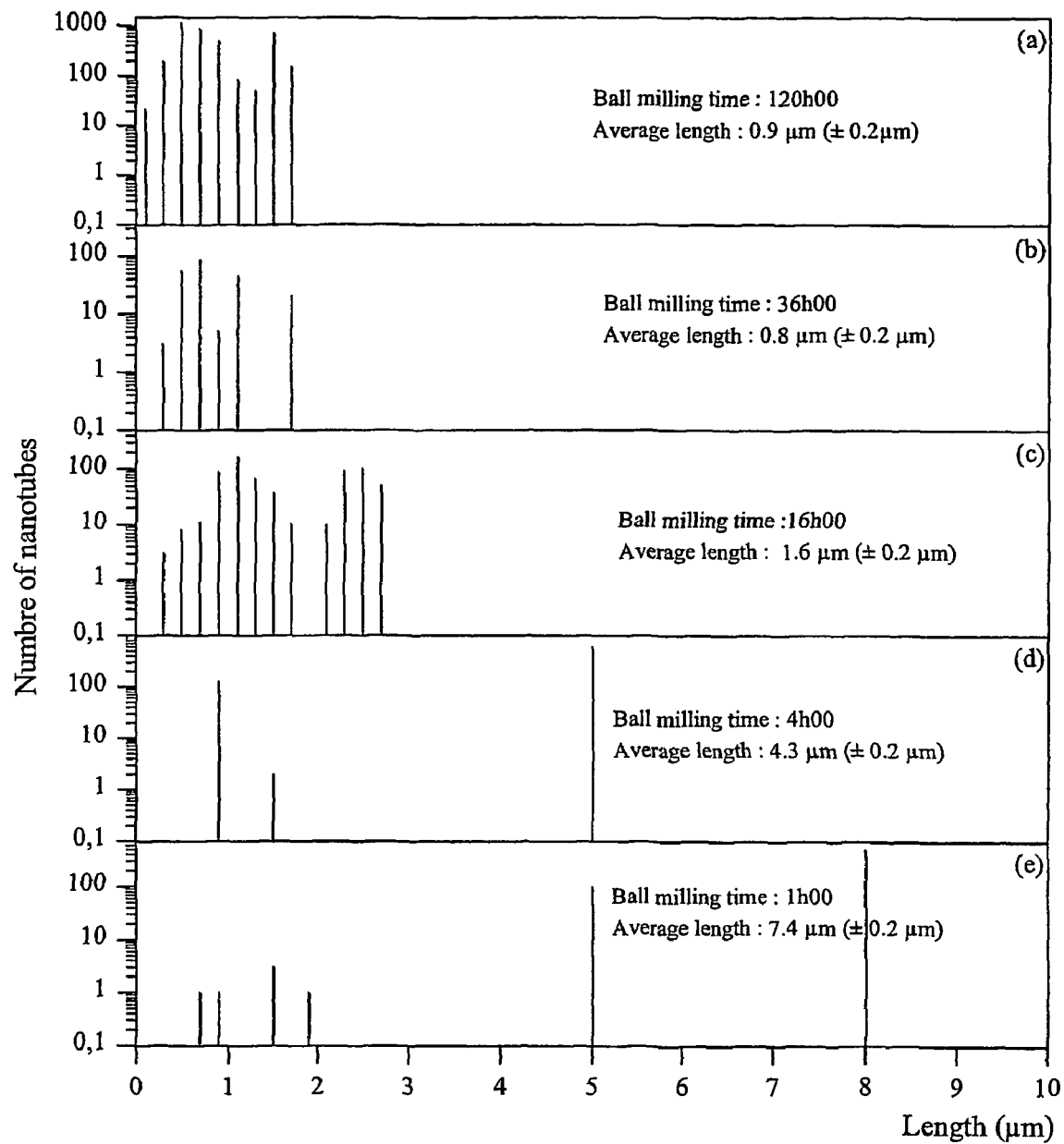
FIGS. 3a-3e represent the length distribution of thick MWNTs for a ball milling time according to the present invention of 120, 36, 16, 4 and 1 hours for FIG. 3a, FIG. 3b, FIG. 3c, FIG. 3d, and FIG. 3e, respectively.

Moreover, in the particular case of thick MWNTs, nanotubes adhesion to form bundles is observed after 120 hours of ball milling, as illustrated on FIGS. 1e and 1f. This phenomenon is limited for mother long nanotubes and was not observed for short thin MWNTs. These differences can be explained by differences in shape between the different types of nanotubes. Indeed, sections of short thick MWNTs are straight, while mother long nanotubes (see FIGS. 1a-1b) and short thin MWNTs (see FIG. 1c) have a curved shape, this limiting their adhesion ability.

It is also important to note, when comparing short thin and thick MWNTs as represented on FIGS. 1a-1f, that short thick MWNTs are individual with continuous shape, while most of the short thin MWNTs are composed of several ca. 50-100 nm sections, these latter sections being part of the mother long nanotubes that have been partially cut by ball milling but which are not disconnected (see in particular FIG. 1a-1c).

2.—Distribution of Carbon Nanotubes

The nanotubes length distributions obtained with thin MWNTs for different ball milling times and derived from TEM images are depicted on FIGS. 2a-2f, while the nanotubes length distributions obtained with thick MWNTs for different ball milling times are depicted on FIGS. 3a-3e.

These results show that the MWNTs distribution became narrow and that there were only short MWNTs after 10 hours of treatment for thin MWNTs and after 16 hours of treatment for thick MWNTs. It can be stated that after these periods all the MWNTs were broken. As can be seen on FIGS. 1e and 1f, further treatment did not affect the global average length and no amorphous carbon appeared even after 120 hours of grinding.

3.—Time Evolution of Carbon Nanotubes Average Length

Figure 4A:
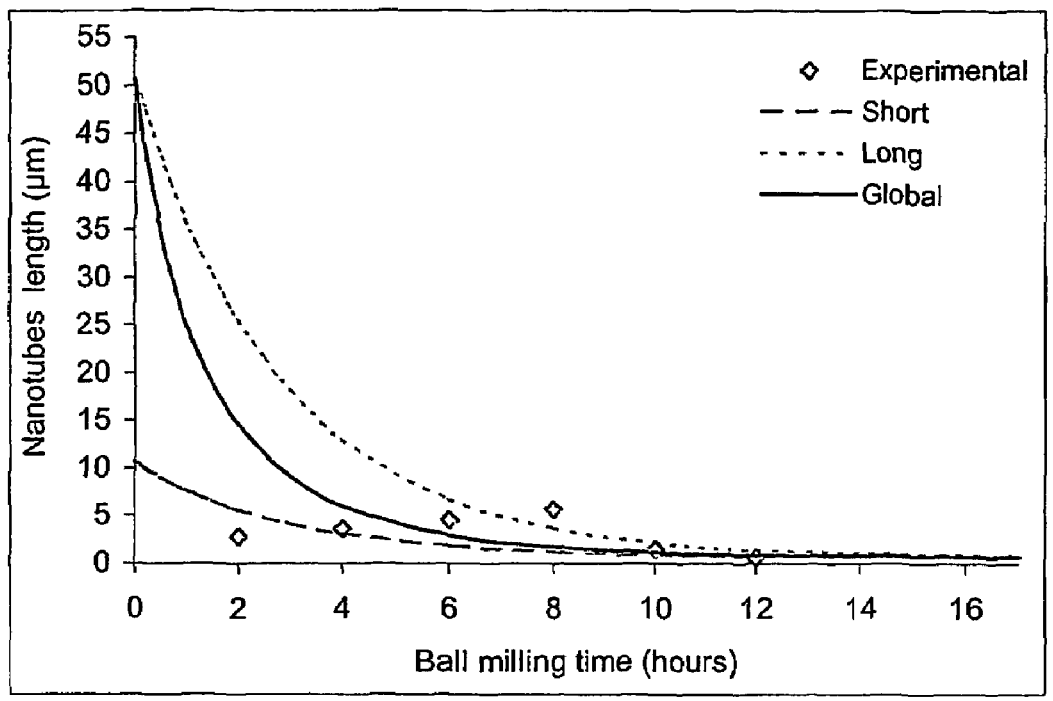
FIGS. 4a and 4b represent the time evolution of carbon nanotubes average length for thin MWNTs and thick MWNTs, respectively, as obtained by the present invention.
Figure 4B:
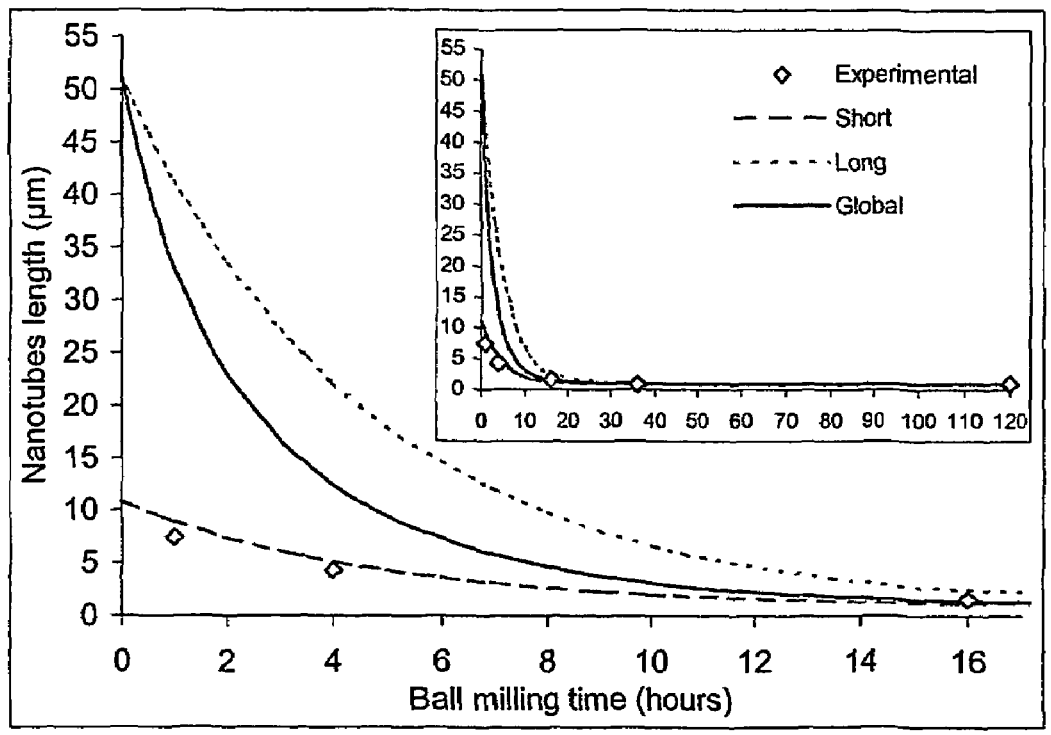

The evolution of the average length of short MWNTs with the grinding time is represented on FIGS. 4a and 4b for thin MWNTs and thick MWNTs, respectively. On these figures, the values entitled <<experimental>> derive from the distributions of FIGS. 2a-2f and 3a-3e. The evolution of the <<experimental>> values as a function of the ball milling time is represented by the curves entitled <<short>>. The latter curves do not take into account the long MWNTs length distributions, because the length of said long MWNTs can not be measured on a single TEM picture. Therefore, it should be understood that the curves entitled <<long>> correspond to calculated values. The curves entitled <<global>> correspond to the weighted average of the preceding curves entitled <<short>> and <<long>>, considering a major contribution of the <<long>> curve during the first two hours (first period) for thin MWNTs and during the first three hours for thick MWNTs.

As can be seen from these figures, the time evolution of MWNTs average length can be approximated by a decreasing exponential with a convergence length of 0.7 µm for thin MWNTs and of 0.9 µm for thick MWNTs, that is to say an average convergence length of 0.8 µm. After 10 hours for the thin MWNTs and 15 hours for the thick ones, the global average length of the final MWNTs reaches its final value (0.7 µm for thin MWNTs and of 0.9 µm for thick MWNTs). This final value depends on the thickness of mother long nanotubes originally used. Further grinding of nanotubes, up to 120 hours (FIG. 4b), does not change the final average length of the nanotubes.

4.—Structure of Nanotubes

Figure 5A:
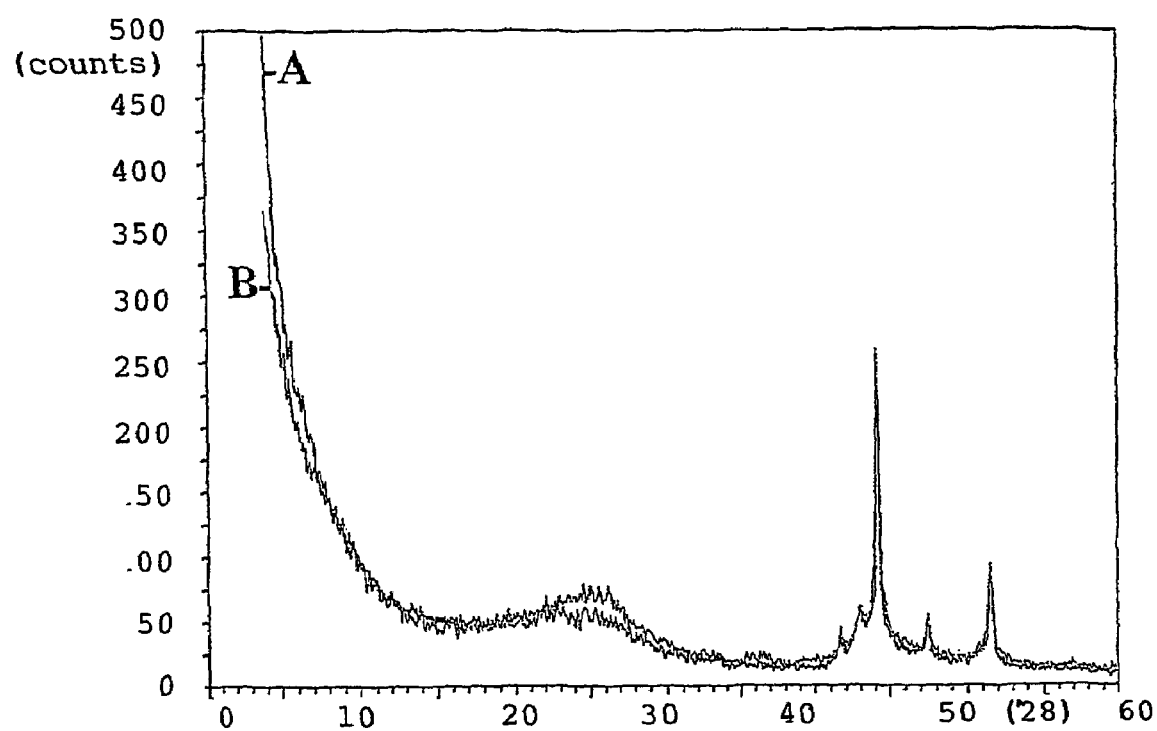
FIGS. 5a-5c represent X-Ray diffraction patterns of different types of carbon nanotubes before (curve A) and after (curve B) different ball milling times according to the method of the present invention.
Figure 5B:
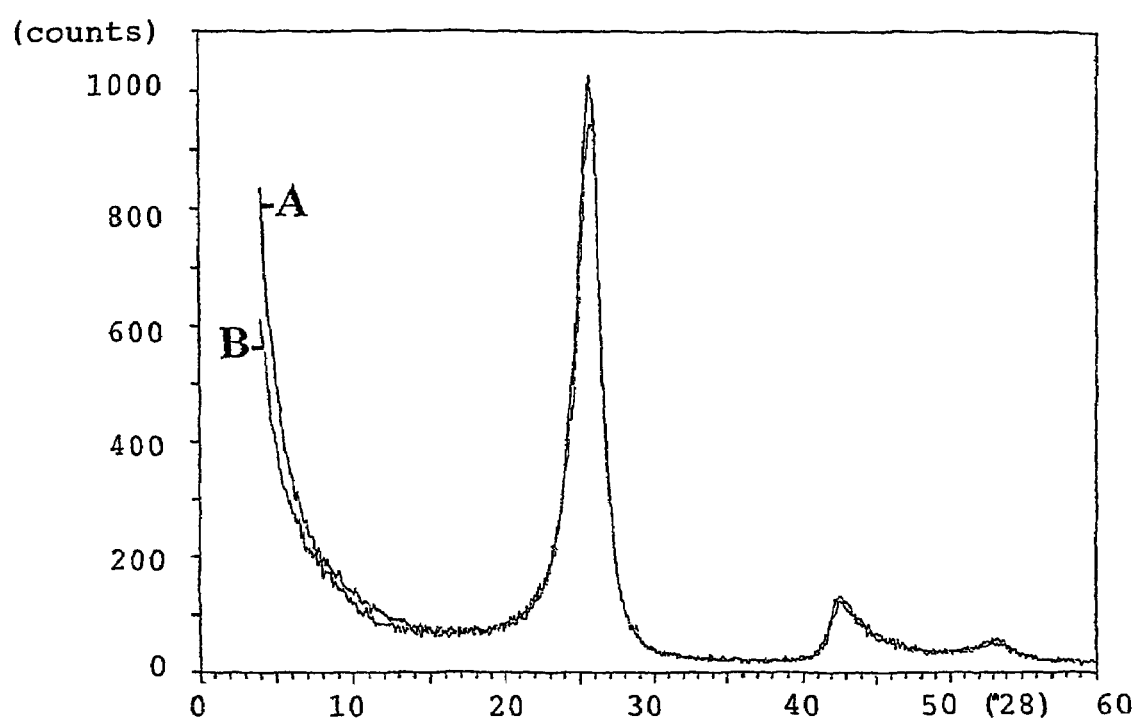
Figure 5C:
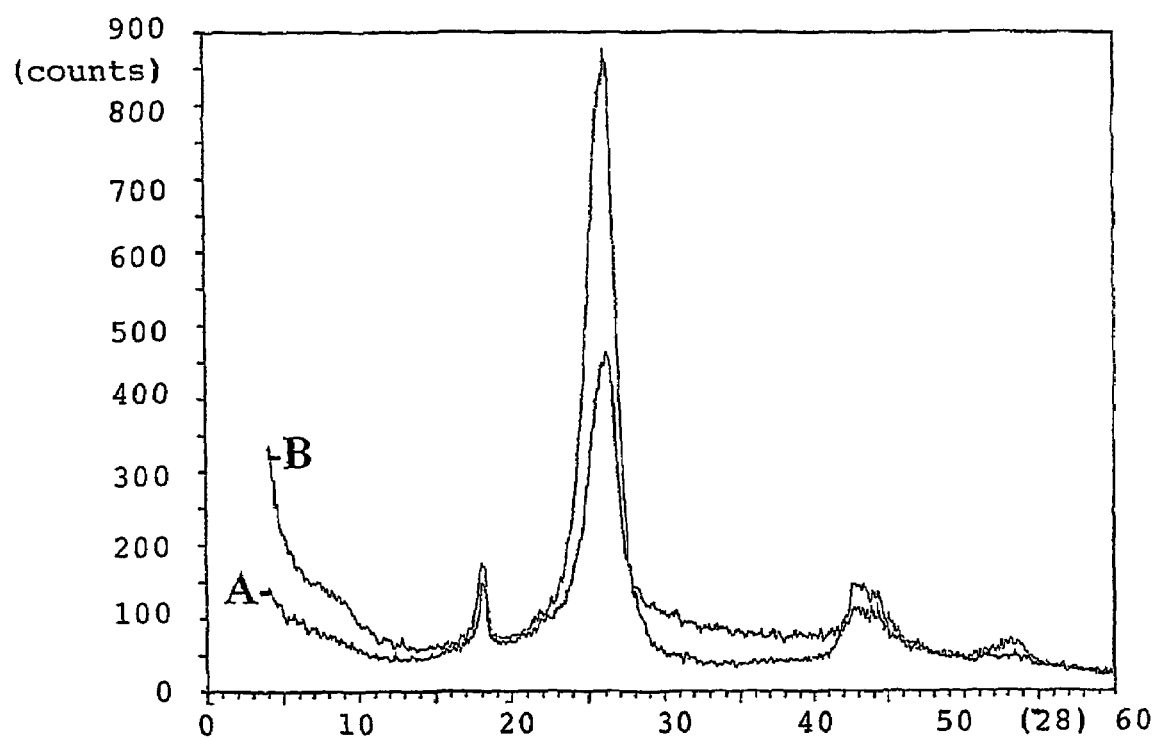

X-Ray diffraction patterns of nanotubes before and after ball milling are shown on FIGS. 5a-5c curve A and curve B, respectively. The similarity of these values for the MWNTs proves that the graphitization remains almost the same for both samples, thus suggesting that the fracture is very localised and does not affect the graphene layer organisation. Very few changes are also observed on the X-Ray diffraction patterns of the SWNTs after ball milling for 8 hours (see FIG. 5a).

Figure 6:
FIG. 6 represents a high resolution TEM image of short thick MWNTs after 120 hours of ball milling according to the present invention.

Short MWNTs with open tips according to the invention can also be observed on FIG. 6 which corresponds to a high resolution TEM image of thick MWNTs after 120 hours of grinding. On the same picture, typical nanotubes adhesion characteristics of short thick MWNTs can also be observed.

After 10 hours for thin MWNTs and 15 hours for the thick ones, the samples are homogeneous: all nanotubes are broken and no long nanotubes remain. Furthermore, no other forms of carbon are formed during the ball milling procedure and the turbostratic structure of nanotubes is maintained. The high resolution TEM image shown on FIG. 6 clearly indicates that the nanotube structure is not damaged and that the tubes have open tips. This latter feature is interesting for potential applications that would take advantage of the confinement effect in the nanotube cavity such as gas adsorption and separation or confinement limited reactions.

5.—Complementary Analysis

It should be noticed that there is no necessity to submit nanotubes to an oxidation pre-treatment before grinding. Indeed, thin MWNTs samples were submitted to a pre-treatment with only HF instead of a double pre-treatment with HF and $KMnO_4$ as mentioned hereabove. In these conditions, the ball milling process leads to short MWNTs of 1 µm average length. Hence, the cutting rate obtained by ball milling in this case is lower when compared to the one obtained when the ball milling is performed on thin MWNTs pretreated with both HF and $KMnO_4$ as mentioned hereabove.

It should be also noticed that other nanotubes samples such as long SWNTs (produced on Co/MgO), long very thin MWNTs (produced on $Co/Fe/Al_2O_3$, on Co/V/NaY or on Co/Mo/NaY), long thin MWNTs and long thick MWNTs samples produced by CVD, were successfully cut into short nanotubes by applying the ball milling process according to the present invention. The nanotubes samples were either pure or contained the catalyst and the support.

He and $H_2$ adsorption properties of functionalised short carbon nanotubes produced compared to long carbon nanotubes:

He or $H_2$ adsorption abilities of functionalised short carbon nanotubes produced compared to the ones of long carbon nanotubes have been studied for both MWNTs and SWNTs.

1. Experimental Protocol

The He and $H_2$ adsorption abilities of carbon nanotubes were measured by pressure swing adsorption using calibrated volumes and a precision pressure gauge. For each pressure studied the equilibrium was reached in less than 2 minutes. The adsorption and desorption curves were superimposed and no histerisis was observed.

2. Case 1: MWNTs

Long very thin MWNTs were firstly synthesised according to the method described in the part entitled "Production of long carbon nanotubes", by catalytic decomposition of acetylene at 700° C. using a mixture of Fe/Co 1.6%/1.6% supported on $Al_2O_3$ as catalyst. The acetylene flow was 30 ml/min and $N_2$ was used as carrier gas at a flow of 300 ml/min. The crude very thin MWNTs thus obtained were containing 80.2 wt % of carbon. They had closed tips, were approximately 10 μm in length, had an average inner/outer diameter of 5/10 nm and had an average number of layers of 8.

Three samples were tested from these crude long MWNTs:
sample 1 containing long MWNTs as such;
sample 2 and sample 3 wherein 4 g fractions of long MWNTs were submitted to ball milling according to the method of the invention during 24 hours.

The three samples, sample 1, sample 2 and sample 3, were studied for their He and $H_2$ adsorption abilities at 77K and 295K with a working pressure of 9 bars. Sample 1 (40 g) containing long MWNTs as such was exposed to vacuum ($10^{-5}$ Torr) at room temperature during 20 hours (step 1). Sample 2 (12 g) was firstly exposed to vacuum at room temperature during 20 hours (step 1), then divided in 4 g fractions that were submitted to a 24 hours ball milling each (step 2), and then again exposed to vacuum at room temperature during 20 hours (step 3). Sample 3 was submitted to the same treatment as sample 2 except that it was then exposed to vacuum at high temperature by heating in vacuum during 5 hours at 1400° C. (step 4). The crude MWTTs have lost 3 wt % on step 3 and 7 wt % on step 4.

TABLE 1 summarises the obtained results
($\pm 0.001$ wt % at 295 K and $\pm 0.01$ wt % at 77 K) at an equilibrium pressure of 9 bars:

| Sample | T° | He adsorbed (wt%) | | $H_2$ adsorbed (wt%) | |
|---|---|---|---|---|---|
| | | Crude[a] | Pure[b] | Crude[a] | Pure[b] |
| 1 (Step 1) Long MWNTs (70 wt %)[c] | 295 K | 0.005 | 0.007 | 0.032 | 0.046 |
| | 77 K | 0.02 | 0.03 | 0.43 | 0.61 |
| 2 (Steps 1-3) Short MWNTs (72 Wt %)[c] | 295 K | 0.003 | 0.004 | 0.037 | 0.051 |
| | 77 K | 0.01 | 0.01 | 0.49 | 0.68 |
| 3 (Steps 1-4) Short MWNTs (78 wt %)[c] | 295 K | 0.001 | 0.001 | 0.044 | 0.056 |
| | 77 K | 0.03 | 0.04 | 0.53 | 0.68 |

[a]Really measured on the sample
[b]Extrapolated to 100% of nanotubes
[c]MWNTs content in the sample As seen in Table 1, the He and $H_2$ adsorption capacities measured at 77 K are one order of magnitude larger than the corresponding values measured at 295 K.

The He adsorption capacities of long and short MWNTs are very low at 295 K and at 77 K. The values are close to the experimental error ($\pm 0.001$ wt % at 295 K and $\pm 0.01$ wt % at 77 K) and no increase of the He adsorption capacity was observed when passing from the long MWNTs to the functionalised short MWNTs.

Concerning the $H_2$ adsorption capacity of the crude MWNTs at 295 K (77 K), values of 0.046 wt % (0.61 wt %) and 0.051 wt % (0.68 wt %) were measured for the long and functionalised short tubes, respectively. It means that the breaking of the long MWNTs to produce short MWNTs causes a 11% (11%) increase of the adsorption capacity of the crude MWNTs. The latter adsorption capacity increase was characteristic of hydrogen adsorption in the central channel of the MWNTs. After the heating of the short crude MWNTs at 1400° C. under vacuum, the $H_2$ adsorption capacity of the material increased to 0.056 wt % (0.68 wt %), meaning that the heat treatment caused a 10% (0%) increase of its $H_2$ adsorption capacity. The latter adsorption capacity increase was characteristic of hydrogen adsorption in the central channel of short MWNTs that were not accessible before the heat treatment. The global effect of the two treatments (ball milling and heating under vacuum) on the crude MWNTs was a hydrogen adsorption capacity increase of 22% (11%) at 295 K (77 K)

3. Case 2: SWNTs

SWNTs were synthesised by catalytic decomposition of methane at 1000° C. in presence of $H_2$, using Co (2.5% w/w) supported on MgO as catalyst. The flow rate of $H_2$ and methane were 300 ml/min and 80 ml/min, respectively.

A concentrated HCl solution was then added to the sample in order to eliminate the support and the catalyst. The SWNTs finally contained in the sample are about 10 μm in length and have an average diameter of 2 nm. The SWNTs represent 60 wt % of the sample, the rest being encapsulated Co nanoparticles.

The efficiency of the ball milling process on cutting and functionalizing SWNTs was studied by TEM, X-ray diffraction and Raman spectroscopy. The TEM results are summarised in Table 2.

TABLE 2

Average length observed by TEM of crude single-wall carbon nanotubes as a function of the ball milling time (0.6 g of crude SWNTs was used).

| Ball mill time (h) | TEM analysis (average SWNTs length) |
|---|---|
| 0 | long SWNTs (10 μm) |
| 0.5 | long + short SWNTs |
| 1 | short SWNTs (5 μm) |
| 2 | very short SWNTs (2 μm) |
| 3 | very short SWNTs (1.5 μm) |
| 4 | pre-graphite + SWNTs (1 μm) |
| 6 | pre-graphite + SWNTs (0.5 μm) |
| 8 | pre-graphite + SWNTs (0.5 μm) |
| 24 | Polycrystalline graphite + SWNTs |
| 48 | Amorphous carbon |
| 51.5 | Amorphous carbon |

From the TEM observations, it was concluded that the ball milling process reduces the length of the SWNTs to 2 μm after 2 hours of treatment. Further ball milling the short SWNTs reduces their length down to 1 μm after 4 hours of treatment. Nevertheless, on the SWNTs samples ball milled for 4 hours or more, other forms of carbon are also observed. These other forms of carbon, the formation of which is concomitant to the destruction of the very shot SWNTs, are pre-graphite, polycrystalline graphite and amorphous carbon (Table 2).

From the X-ray diffraction analysis, it was observed that the $d_{100}$ peak (at $2\theta=42.8°$), characteristic of the carbon-carbon distance in carbon nanotubes and in graphite, decreases with increasing the ball-milling time. Oppositely, the $d_{002}$ peak (at $2\theta=25°$), characteristic of the interplane distance in graphite, increases with increasing the ball-milling time.

On the Raman spectra, it was observed that the D band (at 1270 $cm^{-1}$), characteristic of disordered graphitic structures increases with increasing the ball milling time up to 3 hours. Afterwards, it decreases with increasing the ball milling time and, it disappears for a ball milling time over 50 hours. Concerning the G band (at 1597 $cm^{-1}$) characteristic of graphitic structures and, mainly of its shoulder (at 1555 $cm^{-1}$) characteristic of SWNTs, they decrease with increasing the ball milling time and also disappear for a ball milling time over 50 hours. From the breathing modes of SWNTs (low frequency bands at 80-250 $cm^{-1}$), it was observed that the large SWNTs are the first destroyed during the ball milling process. After 3 hours of ball milling, the content of large SWNTs decreases and after 8 hours very small low frequency bands are observed. On the sample ball milled for 51.5 hours, none of the Raman characteristic band of SWNTs could be observed.

Three SWNTs samples, sample 4, sample 5 and sample 6 (Table 3), were studied for their He and $H_2$ adsorption ability at 77 K and 295 K with a working pressure of 9 bars. Sample 4, containing 2.8 g of long SWNTs as such, was exposed to vacuum at room temperature during 20 hours. Sample 5 and sample 6 containing 1.4 g of long SWNTs were firstly submitted to ball milling according to the method of the invention during 1 hour and 12 hours for sample 5 and sample 6, respectively, before being exposed to vacuum at room temperature during 20 hours. After being exposed to vacuum the SWNTs ball milled for one and 12 hours have lost 4 wt % and 6 wt %, respectively.

TABLE 3 summarises the obtained results on the samples at an equilibrium pressure of 9 bars:

| Sample | T° | He adsorbed (wt %) | | $H_2$ adsorbed (wt %) | |
|---|---|---|---|---|---|
| | | Crude[a] (±0.01) | Pure[b] | Crude[a] (±0.01) | Pure[b] |
| 4 | 295 K | 0.02 | 0.04 | 0.20 | 0.37 |
| Long SWNTs (54 wt %)[c] | 77 K | 0.03 | 0.06 | 1.36 | 2.52 |
| 5 | 295 K | 0.02 | 0.04 | 0.28 | 0.50 |
| Short SWNTs (56 wt %)[c] | 77 K | 0.03 | 0.05 | 1.74 | 3.11 |
| 6 | 295 K | 0.01 | 0.02 | 0.32 | 0.56 |
| Very short SWNTs (57 wt %)[c] | 77 K | 0.02 | 0.04 | 1.86 | 3.26 |

[a]Really measured on the sample
[b]Extrapolated to 100% of nanotubes
[c]SWNTs content in the sample As seen in Table 3, the He and $H_2$ adsorption capacities measured at 77 K are larger than the corresponding values measured at 295 K.

The He adsorption capacities of long, short and very short SWNTs are very low at 295 K and at 77 K. The values are close to the experimental error (±0.01 wt %) and no increase of the He adsorption capacity was observed when passing from the long to the short or very short SWNTs.

Concerning the $H_2$ adsorption capacity of the crude SWNTs at 295 K (77 K), values of 0.37 wt % (2.52 wt %) and 0.50 wt % (3.11 wt %) were measured for the long and short tubes, respectively. It means that the ball milling of the long SWNTs for one hour to produce short SWNTs causes a 35% (23%) increase of the $H_2$ adsorption capacity of the SWNTs. The latter adsorption capacity increase was characteristic of hydrogen adsorption in the central channel of the SWNTs. After ball milling of the short SWNTs for 12 hours, the $H_2$ adsorption capacity of the material increased to 0.56 wt % (3.26 wt %), meaning that the last 11 hours of ball milling caused a 12% (5%) increase of its $H_2$ adsorption capacity. The latter adsorption capacity increase was characteristic of hydrogen adsorption in the central channel of very short SWNTs that were not yet accessible after 1 hour of ball milling. The effect of ball milling/functionalisation for 12 hours on the SWNTs was a hydrogen adsorption capacity increase of 51% (29%) at 295 K (77 K).

Purification of the Nano Tubes by Size Exclusion Chromatography

In order to separate functionalised short carbon nanotubes in fractions of narrower length distribution, 10 mg of the thin MWNTs ball milled for 12 hours were fractionated by size exclusion chromatography (J.-M. Bonard et al., *Adv. Mater.* 9, 827-831 (1997); G. S. Duesberg et al., *Appl. Phys. A* 67, 117-119 (1998); G. S. Duesberg et al., *Chem. Commun.* 435-436 (1998); G. S. Duesberg et al., *Synthetic Metals* 103, 2484-2485 (1999)). The stationary phase was CPG 1400 Å (a Controlled-Pore Glass material for column packing having a large internal surface of controlled pores with free access), occupying 15 cm in length, in a column of 2 cm in diameter. The mobile phase was 0.25 wt % of SDS (Sodium Dodecyl Sulphate) in water.

The 10 mg of short carbon nanotubes were first dispersed in 2 ml of 1 wt % SDS in water by sonication and then introduced at the top of the column conditioned with the mobile phase. Afterwards, the mobile phase was passed throughout the column during 2 h at a rate of 27 ml/h. After the death volume, 36 fractions of 1.5 ml were collected and analysed by TEM.

For the TEM analysis, a drop of the suspension was deposited on a carbonated Cu/Rh grid and the grid was dried under vacuum. Typical TEM pictures of each sample were recorded and the nanotubes lengths were measured manually on the pictures.

The nanotubes lengths were then used to make the length distribution histogram of each fraction. Afterwards, the fractions were assembled gradually by 3 to generate 12 samples.

Figure 7:
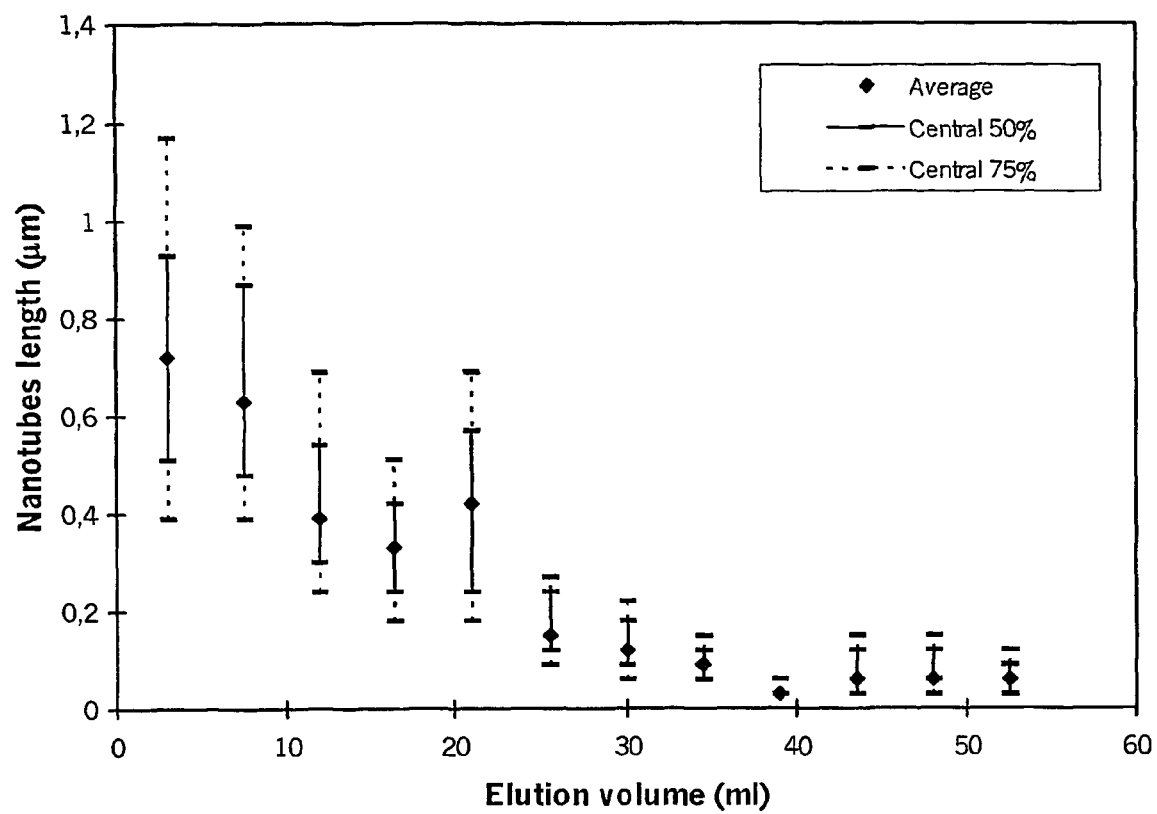
FIG. 7 represents the elution profile obtained by size exclusion chromatography performed on 10 mg thin MWNTs after 12 hours ball milling according to the present invention.

On FIG. 7 is presented the elution profile thus obtained. As seen in this figure, the average nanotubes length decreases on increasing the elution volume. The borders of the central 50% and central 75% of each sample gives an idea of the length distribution histogram of each sample. The separation of the short nanotubes by size exclusion chromatography makes possible to get functionalised short carbon nanotubes of narrow length distribution (see FIG. 7). Moreover, very short carbon nanotubes (average length <0.1 μm; ca. fractions 712-12 on FIG. 7) of very narrow length distribution (ca. fraction 9 on FIG. 7) can also be obtained for the large elution volumes. Note that for all of the 12 fractions represented in FIG. 7, at least 50% of the nanotubes length is in the range: average length ±50%.

FIG. 8a is a typical TEM picture of the functionalised short thin MWNTs before their separation by size exclusion chromatography, while FIGS. 8b-8d correspond to TEM pictures which do illustrate the narrow length distribution of the functionalised short carbon nanotubes separated by size exclusion chromatography for an elution volume of 7.5, 39 and 48 ml, respectively. It should be noted that on FIG. 8c, which corresponds to sample 9 i.e. the sample containing the smallest functionalised short nanotubes (see FIG. 7 as reference), the ratio length/diameter goes down to 1 for some of the short nanotubes. It means that some of the short nanotubes are smaller than 20 nm.

Part II—Production of Functionalised Short Carbon Nanotubes Using Reactants Other than $H_2O$ from Moist Air.

Long thin MWNTs were synthesized by catalytic decomposition of acetylene on alumina supported Co/Fe catalyst. The long thin MWNTs are purified in two steps. First, the alumina support is dissolved by refluxing in sodium hydroxide solution during two days. Secondly, the metals are dissolved by stirring in concentrated hydrochloric acid during 5 hours. The two steps were performed twice in order to remove all the catalyst traces. Finally, the long thin MWNTs are washed with water until a neutral pH is reached.

Ball-milling in specific atmosphere was used to introduce easily chemical or functional groups like thiol, amine and amide, chlorine, carbonyl, thiomethoxy, acyl chloride, hydroxyl and C-H functions, etc. on carbon nanotubes.

The functionalization of the carbon nanotubes were performed as follows: first, the carbon nanotubes were placed in a ball-mill and the system was either heated in nitrogen atmosphere or was exposed to vacuum in order to remove the water. Then, the reactant gas was introduced and maintained during the ball-milling process. Finally, the excess of reactant gas was removed either using nitrogen stream or evacuating the system for 1 hour under vacuum.

It is of interest that after the ball-milling process, the apparent density of the functionalized carbon nanotubes increases by about one order of magnitude, compared to the initial long carbon nanotubes. This originates from the disappearance of the "air bubbles" existed in the web-like nanotube sample before treatment. It is noteworthy that this feature is very promising in the applications of nanotubes as polymer fillers since the homogenization becomes easier.

In order to obtain more information from the breaking process two different mills were used, the first is an agate mortar with a big agate ball, while the second is a special metal mortar with several small metal balls. The MWNT samples before and after functionalization were characterized by X-ray Photoelectron Spectroscopy (XPS), Infrared Spectroscopy (IR), volumetric adsorption techniques and Transmission Electron Microscopy (TEM).

The results of the volumetric adsorption measurements confirm the physical changes. While the specific surface area of pure MWNTs is around 250 m²/g, after the treatment (breaking and functionalization) this value increases significantly. The calculated pore radius is around 20 Å after breaking, irrespective of the reactant atmosphere. According to the results obtained from the volumetric adsorption measurements it follows that the carbon nanotubes have open ends and the chemical or functional groups generated during the treatment leave the inner pores accessible. Table 4 shows the specific surface areas, the pore radii, the chemical or functional groups formed during the treatment and the characteristic IR bands of ball-milled carbon nanotubes.

TABLE 4

BET surface area, pore radius and chemical or functional group generated by ball-milling

| Sample | BET (m²/g) | $R_p$ (Å) | Functional Groups[a] | IR bands (cm⁻¹) |
|---|---|---|---|---|
| MWNTs | 254 | 67 | (—OH, —COOH)[b] | — |
| MWNTs broken in $H_2O$ | 291 | 20 | —OH | — |

TABLE 4-continued

BET surface area, pore radius and chemical or functional group generated by ball-milling

| Sample | BET (m²/g) | $R_p$ (Å) | Functional Groups[a] | IR bands (cm⁻¹) |
|---|---|---|---|---|
| MWNTs broken in $H_2S$ | 288 | 20 | —SH | 791 |
| MWNTs broken in $NH_3$ | 276 | 20 | —$NH_2$, —$CONH_2$ | 1490 |
| MWNTs broken in $Cl_2$ | 192 | 20 | —Cl | — |
| MWNTS broken in CO | 283 | 20 | >C=O | 1675 |
| MWNTs broken in $CH_3SH$ | 294 | 20 | —$SCH_3$ | 615 |
| MWNTs broken in $COCl_2$ | 278 | 20 | —COCl | 1785 |
| MWNTs broken in $H_2$ | 295 | 20 | —H | — |
| SWNTs | 757 | — | (—OH, —COOH)[b] | — |
| SWNTs broken in $H_2O$ | 1500 | — | —OH | — |

[a]Only the most abundant functions are represented.
[b]The —OH and —COOH functions, measured by titration, were introduced during the purification of the nanotubes.

Deconvoluting the $C_{1s}$ XPS spectra of purified MWNTs (FIG. 9a) and of purified MWNTs functionalised with $NH_3$ (FIG. 9b), five peaks are obtained. The first one is observed at 284.5 (±0.1) eV and is due to $sp^2$-hybridized carbon atoms and carbon atoms bonded to hydrogen atoms. The peaks for $sp^3$-hybridized carbon atoms are centered at 285.1 (±0.1) eV. The peaks at 286.1 (±0.2) eV, 287.4 (±0.2) eV and 289.0 (±0.1) eV represent, the carbon atoms bonded to one oxygen atom by a single bond (e.g., alcohol, ether), by a double bond (e.g. ketone, aldehyde, amide) and to two oxygen atoms (e.g. ester, carboxylic acid), respectively. The peak at 291.0 (±0.1) eV is characteristic of the shake-up of the $sp^2$-hybridized carbon atoms.

The $S_{2p}$ XPS spectra of MWNTs which have been treated with $H_2S$ show one component at 163.6 (±0.2) eV (FIG. 10a). This value corresponds to free mercaptans.

The deconvolution of $N_{1s}$ XPS spectra of ammonia treated MWNTs shows two species: the first at 399.0 eV and the second at 400.5 eV (FIG. 10b). The first peak is attributed to amine functional groups and the second is due to the presence of amide.

From the experimental results, a simple mechano-chemical way of functionalization can be assumed. If two different ball-milling systems are compared it seems that the efficiency of breaking depends on the geometry of the mill and the duration of the treatment. It seems that cleavage starts not only at places of defects, but also the mechanical stress induces the formation of defects and, finally, the cleavage of the tubes. Surprisingly the cleavage of the C-C bonds takes place in the presence of $NH_3$, $Cl_2$, $H_2S$, $H_2O$, so that new bonds between the carbon nanotubes and the reactant are formed. Certainly, the efficiency of this reaction strongly depends on the reactant, albeit in our case the solid material obtained after treatments contained functional groups in rather high quantity.

In conclusion, the ball-milling induced functionalisation of MWNTs under reactive atmospheres allows the production of short carbon nanotubes containing different chemical functions. The process can be carried out on large scale (up to 50 g per reaction actually) resulting in high amount of functionalized short nanotubes. Introduction of amine and amide functional groups using ammonia as well as the introduction of thiol using hydrogen sulfide was confirmed by the XPS results. Other chemical or functional groups can also be easily introduced by this technique. Moreover, these preliminary results, summarised on Table 4, show that the technique can be applied not only for multi-walled but also for single-walled nanotubes.

What is claimed is:

1. A method for producing functionalised short carbon nanotubes with at least one open tip comprising mechanically treating long carbon nanotubes in a powder form, wherein a reactant gas able to chemically react with said long nanotubes is chosen and said long carbon nanotubes in a powder form are submitted to mechanical milling forces in the presence of said reactant gas so that short carbon nanotubes, comprising at least one specific chemical group, are obtained, and wherein said reactant gas is not air.

2. The method according to claim 1, wherein the treating comprises:
   making a powder containing long carbon nanotubes;
   introducing said powder into a ball milling apparatus containing one or several solid particles of at least 1 mm in length;
   grinding said powder with said ball milling apparatus for a sufficient time so that a mixture containing a specific percentage of short nanotubes with specific length is obtained, while introducing the adequate reactant gas, said reactant gas being not air; and
   removing any excess of the reactant gas.

3. The method according to claim 1, wherein the reactant gas is selected from the group consisting of: $H_2$, $H_2O$, $NH_3$, $R-NH_2$, $F_2$, $Cl_2$, $Br_2$, $I_2$, $S_8$, alcohols, thiols, acids, bases, esters, peracids, peroxids, CO, $COCl_2$ and $SOCl_2$.

4. The method according to claim 1, wherein the chemical group introduced on the short carbon nanotubes produced is selected from the group consisting of: SH, $NH_2$, NHCO, OH, COOH, F, Br, Cl, I, R—NH, R—O, R—S, CO, COCl and SoCl.

5. The method according to claim 2, wherein any excess reactant gas in the ball milling apparatus is removed using nitrogen stream or evacuation to vacuum.

6. The method according to claim 2, wherein the time of grinding is between $10^{-3}$ and $10^3$ hours.

7. The method according to claim 2, wherein said grinding is continuous.

8. The method according to claim 2, wherein said grinding is discontinuous.

9. The method according to claim 1, further comprising purifying the short carbon nanotubes according to their length by size exclusion chromatography.

10. The method according to claim 1, wherein the percentage of short nanotubes contained in the mixture is between about 1% and about 100%.

11. The method according to claim 1, wherein the length of the short nanotubes contained in the mixture is shorter than 50 µm.

12. The method according to claim 1, wherein length of the long carbon nanotubes is between 1 µm and 500 µm.

13. The method according to claim 1, wherein the long carbon nanotubes are single-wall long carbon nanotubes or multi-wall long carbon nanotubes or a mixture thereof.

14. The method according to claim 2, wherein the length of the short nanotubes contained in the mixture is shorter than about 2 µm.

* * * * *

UNITED STATES PATENT AND TRADEMARK OFFICE
CERTIFICATE OF CORRECTION

PATENT NO.         : 7,419,650 B2                                      Page 1 of 1
APPLICATION NO. : 10/363201
DATED              : September 2, 2008
INVENTOR(S)        : Pierard et al.

It is certified that error appears in the above-identified patent and that said Letters Patent is hereby corrected as shown below:

Title Page, Item (73), Assignee, please change "Universitaries" to --Universitaires--.

Title Page, Item (56), Other Publications, please change "Nanocomposties:." to --Nanocomposites:.--.

At column 1, line 52, please change "resistent" to --resistant--.

At column 5, line 31, please change "$C_{1s}SXPS$" to --$C_{1s}XPS$--.

At column 5, line 33, please change "$C_{1s}SXPS$" to --$C_{1s}XPS$--.

At column 5, line 49, please change "(MWNTS)" to --(MWNTs)--.

At column 6, line 14, please change "MWNTS>>" to --MWNTs>>--.

At column 6, line 42, please change "Mgo" to --MgO--.

At column 9, line 39 (approx), please change "MWTTs" to --MWNTs--.

At column 10, line 25, after "(77 K)" please insert --.--.

At column 12, line 21, please change "Nano Tubes" to --Nanotubes--.

At column 12, line 57, please change "712-" to --7- --.

At column 15, line 24 (in Claim 2), after "introducing", please delete "the".

Signed and Sealed this

First Day of September, 2009

David J. Kappos
*Director of the United States Patent and Trademark Office*